United States Patent
Leng et al.

(10) Patent No.: US 12,158,364 B2
(45) Date of Patent: Dec. 3, 2024

(54) ON-SITE CALIBRATION METHOD OF ULTRASONIC FLOWMETER BASED ON ACOUSTIC VELOCITY DETECTION

(71) Applicant: QINGDAO HEADWATERS TECHNOLOGY CO., LTD., Qingdao (CN)

(72) Inventors: Jiqiang Leng, Qingdao (CN); Guoshun Li, Qingdao (CN)

(73) Assignee: Qingdao Headwaters Technology Co., Ltd, Qingdao (CN)

( * ) Notice: Subject to any disclaimer, the term of this patent is extended or adjusted under 35 U.S.C. 154(b) by 241 days.

(21) Appl. No.: 17/894,114

(22) Filed: Aug. 23, 2022

(65) Prior Publication Data

US 2024/0077346 A1    Mar. 7, 2024

(51) Int. Cl.
*G01F 1/66*    (2022.01)
*G01F 1/667*   (2022.01)

(52) U.S. Cl.
CPC .................................. *G01F 1/668* (2013.01)

(58) Field of Classification Search
CPC ......... G01C 25/00; G01F 1/668; G01F 25/00; G01F 25/10; G01F 25/11; G01F 25/14; G01G 23/01; G01H 3/005; G01L 25/00; G01L 25/003; G01L 27/00; G01N 27/4175; G01N 29/30; G01N 33/0006; G01N 35/00594; G01N 35/00693; G01P 21/00; G01P 21/02; G01P 21/025; G01V 13/00; G03B 43/00; G03B 43/02; G04D 7/004; G04D 7/1207; G04D 7/1214; G04D 7/1221

See application file for complete search history.

(56) References Cited

U.S. PATENT DOCUMENTS

| | | | | |
|---|---|---|---|---|
| 11,344,668 | B2 * | 5/2022 | Sileika | A61K 38/28 |
| 11,366,569 | B2 * | 6/2022 | Xia | G06F 3/0484 |
| 2022/0155117 | A1 * | 5/2022 | Brown | F17D 3/01 |
| 2022/0197559 | A1 * | 6/2022 | Chen | G06F 3/067 |

FOREIGN PATENT DOCUMENTS

CN    111256788 B  *  2/2022  ......... G01F 25/0007

\* cited by examiner

*Primary Examiner* — Brandi N Hopkins
*Assistant Examiner* — Nigel H Plumb (57) ABSTRACT

An on-site calibration method of an ultrasonic flowmeter based on acoustic velocity detection includes: collecting layered water temperature measured values of respective acoustic channels of the ultrasonic flowmeter, to obtain abnormal data of the layered water temperature measured values; and based on an abnormal acoustic channel corresponding to the abnormal data, calibrating the abnormal acoustic channel of the ultrasonic flowmeter through acquiring a layered line flow velocity. The calibration method aims at practical problems such as accuracy calibration of stock equipment in-use, and technical updating and iteration of ultrasonic flowmeter based on acoustic velocity detection, and proposes an ideological system of three key technologies, namely, direct measurement and indirect measurement technology, laboratory comparison and real flow comparison technology, and measurement uncertainty combine technology, which makes the inspection of the massive flow rate and high precision transit-time ultrasonic flowmeter develop towards the direction of no submission for inspection.

1 Claim, 2 Drawing Sheets

Step 1: Calculating a still-water acoustic velocity between transducers of the ultrasonic flowmeter as follows:
$$C = \frac{L}{2} \times \left(\frac{1}{tu} + \frac{1}{td}\right)$$

Step 2: Obtaining a measured water temperature based on the relationship between the still-water acoustic velocity and temperature Step 3: Comparing the measured water temperature with a standard water temperature to obtain a comparative result Step 4: Adjusting an acoustic channel length of the transducers based on the comparative result Step 5: Adjusting the acoustic channel length of to-be-calibrated transducers of the transducers until the measure water temperature is closed to the standard water temperature, thereby completing the calibration of the still-water acoustic velocity between transducers Step 6: Calibrating a line flow velocity of the ultrasonic flowmeter, calibrating acoustic channel angle of the ultrasonic flowmeter, and calibrating a flow area of the ultrasonic flowmeter, thereby completing the calibration of the ultrasonic flowmeter

ON-SITE CALIBRATION METHOD OF ULTRASONIC FLOWMETER BASED ON ACOUSTIC VELOCITY DETECTION

TECHNICAL FIELD

The invention belongs to the field of flowmeter calibration technologies, and in particularly to an on-site calibration method of an ultrasonic flowmeter based on acoustic velocity detection.

BACKGROUND

In the calibration of massive flow rate and high precision flowmeters, traditional calibration methods include a volume method, a weighing method and a standard meter method. These methods have disadvantages of high calibration cost and great difficulty in submission for inspection. Accordingly, there is an urgent need for an on-site calibration method of an ultrasonic flowmeter based on acoustic velocity detection, to make an inspection of the massive flow rate and high precision transit-time ultrasonic flowmeter evolve towards the direction of no submission for inspection.

SUMMARY

In order to resolve the above-mentioned problems, an embodiment of the invention provides an on-site calibration method of an ultrasonic flowmeter based on acoustic velocity detection, including steps as follows:
  collecting layered water temperature measured values of respective acoustic channels of the ultrasonic flowmeter, to get abnormal data of the layered water temperature measured values; and
  based on an abnormal acoustic channel corresponding to the abnormal data, calibrating the abnormal acoustic channel of the ultrasonic flowmeter through acquiring a layered line flow velocity.

In an embodiment, during a process of getting an instantaneous flow rate, the instantaneous flow rate is obtained based on a cross-section average flow velocity and a flow area (also referred to as discharge area) of the acoustic channel. The abnormal acoustic channel of the ultrasonic flowmeter is calibrated based on the cross-section average flow velocity and the flow area.

In an embodiment, during the process of getting the instantaneous flow rate, an expression for getting the instantaneous flow rate is:

$$Q = \overline{V} \times S,$$

while Q represents the instantaneous flow rate, $\overline{V}$ represents the cross-section average flow velocity, and S represents the flow area.

In an embodiment, during the process of acquiring the layered line flow velocity, the layered line flow velocity is acquired through getting a time of up-water acoustic wave propagation (also referred to as time of upstream acoustic wave propagation), a time of down-water acoustic wave propagation (also referred to as time of downstream acoustic wave propagation), an acoustic velocity propagation time difference, an acoustic channel length, and an acoustic channel angle. The acoustic channel length refers to a linear distance between two transducers. The abnormal acoustic channel is calibrated based on the layered line flow velocity and the acoustic channel angle.

In an embodiment, during a process of calibrating the abnormal acoustic channel, the abnormal acoustic channel is calibrated based on the instantaneous flow rate and/or the layered line flow velocity.

In an embodiment, during the process of acquiring the layered line flow velocity, a still-water acoustic velocity is obtained through an indirect measurement method, and a measured water temperature corresponding to the still-water acoustic velocity is performed comparative measurement with a reference water temperature to determine measurement accuracy of the still-water acoustic velocity. The criteria for determining the measurement accuracy of the still-water acoustic velocity are as follows:
  when the measured water temperature is 0-0.51 degrees Celsius (° C.), which denotes the measurement of the still-water acoustic velocity is accurate;
  when the measured water temperature is 0.51-1° C., which denotes the measurement of the still-water acoustic velocity is basically accurate;
  when the measured water temperature is greater than 1° C., which denotes a result of the comparative measurement is unsatisfactory, and thus an operation of adjustment and repair is needed.

In an embodiment, during a process of getting the still-water acoustic velocity, the still-water acoustic velocity is expressed as:

$$C = \frac{L}{2} \times \left( \frac{1}{tu} + \frac{1}{td} \right)$$

while L represents the acoustic channel length, tu represents the time of up-water acoustic wave propagation, td represents the time of down-water acoustic wave propagation.

In an embodiment, during the process of acquiring the layered line flow velocity, the layered line flow velocity is expressed as follows:

$$V_i = \frac{L}{2 \cos \alpha} \times \frac{\Delta t}{tu \times td}$$

while $V_i$ represents the layered line flow velocity, $\alpha$ represents the acoustic channel angle, and $\Delta t$ represents the acoustic velocity propagation time difference and satisfies $\Delta t = tu - td$.

In an embodiment, during a process of calibrating the abnormal acoustic channel, adjusting the acoustic channel length and getting a difference between an average value of measured water temperatures and the reference water temperature to calibrate a transducer group of the abnormal acoustic channel.

In an embodiment, during a process of getting the still-water acoustic velocity through the indirect measurement method, an indirect measurement uncertainty of the still-water acoustic velocity is generated through getting an uncertainty component of a direct measurement value for generating the still-water acoustic velocity, the direct measurement value refers to a directly measured feature value, and the feature value is configured to generate the still-water acoustic velocity through the indirect measurement method. An equation expression of the indirect measurement uncertainty is as follows:

$$u_c = \sqrt{u_1^2 + u_2^2 + u_3^2 + \ldots + u_i^2}$$

while $u_c$ represents the indirect measurement uncertainty, $u_i$ represents the uncertainty component, and i is a positive integer.

The invention may have advantages of simple, practical and low cost.

BRIEF DESCRIPTION OF THE DRAWINGS

In order to more clearly illustrate technical solutions in embodiments of the invention or in the related art, drawings used in the embodiments will be briefly introduced below. Apparently, the drawings described below are only some of embodiments of the invention, and for those skilled in the art, other drawings can be obtained according to these drawings without any creative work.

DETAILED DESCRIPTION OF EMBODIMENTS

In order to make purposes, technical solutions and advantages of embodiments of the invention clearer, the technical solutions in the embodiments of the invention will be clearly and completely described below with reference to the accompanying drawings in the embodiments of the invention. Apparently, the described embodiments are only some of embodiments of the invention, rather than all of embodiments of the invention. Generally, components of the embodiments of the invention described and shown in the accompanying drawings herein may be arranged and designed in a variety of different configurations. Therefore, the following detailed description of the embodiments of the invention with reference to the accompanying drawings is not intended to limit the scope of protection of the invention, but merely represents selected embodiments of the invention. Based on the illustrated embodiments of the invention, all other embodiments obtained by those skilled in the art without creative work should fall within the scope of protection of the invention.

Figure 1:
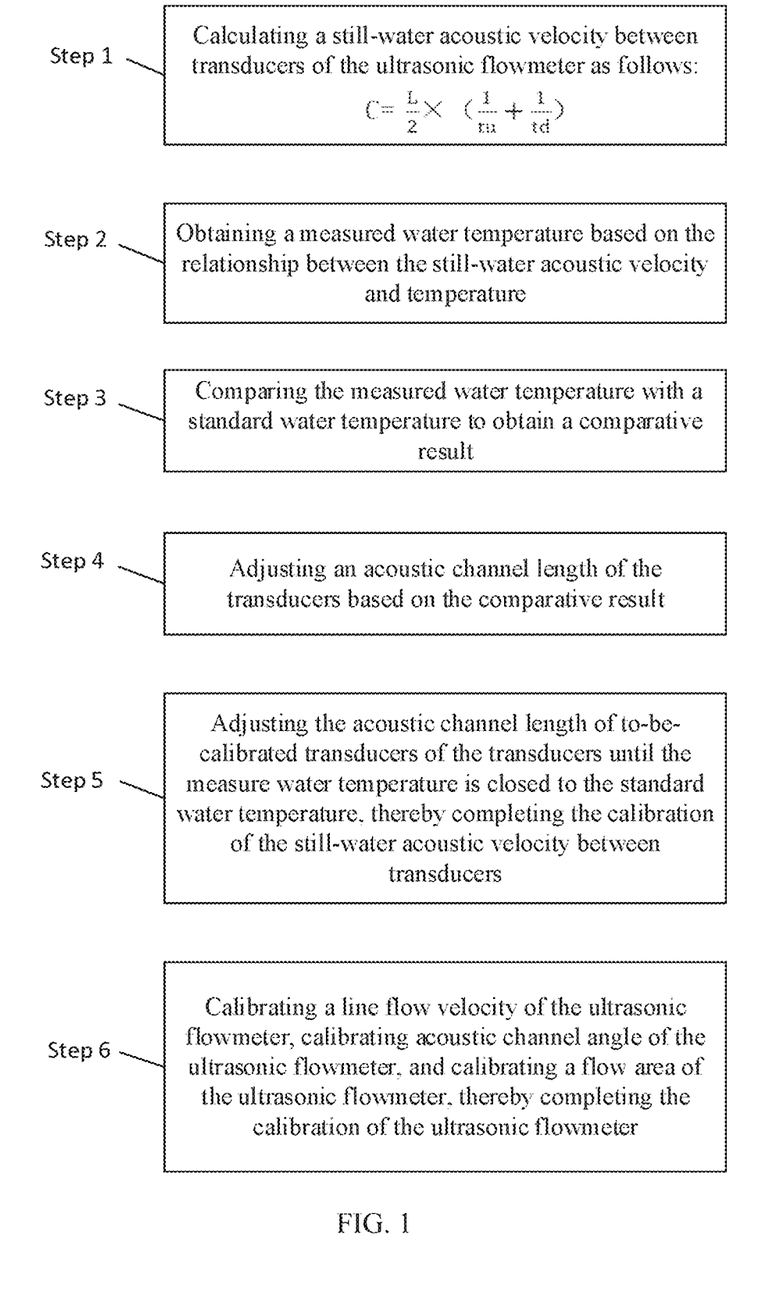
FIG. 1 illustrates a schematic flowchart according to an embodiment of the invention.
Figure 2:
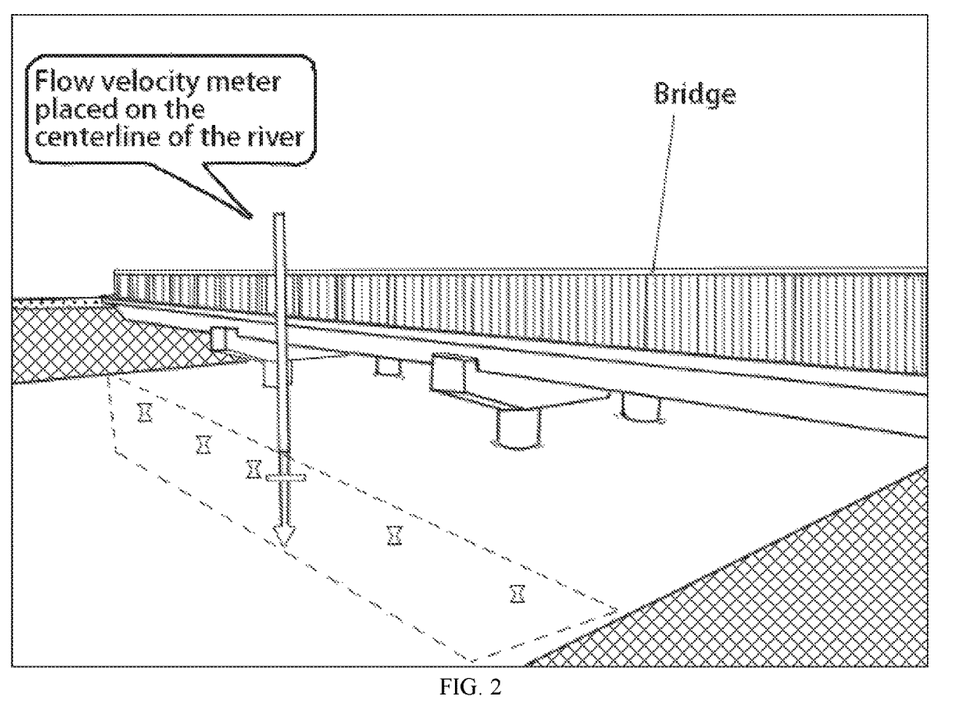
FIG. 2 illustrates a schematic view of measuring a distance from a bridge to a measurement cross-section at downstream.

As illustrated in FIG. 1 and FIG. 2, an embodiment of the invention provides an on-site calibration method of an ultrasonic flowmeter based on acoustic velocity detection. The on-site calibration method may include steps:
  collecting layered water temperature measured values of respective acoustic channels of the ultrasonic flowmeter, and getting abnormal data of the layered water temperature measurement values; and
  based on an abnormal acoustic channel corresponding to the abnormal data, calibrating the abnormal acoustic channel of the ultrasonic flowmeter through acquiring a layered line flow velocity.

In a preferred embodiment, during a process of getting an instantaneous flow rate, the instantaneous flow rate is obtained based on a cross-section average flow velocity and a flow area (also referred to as discharge area) of the abnormal acoustic channel, and the instantaneous flow rate (of the abnormal acoustic channel) is calibrated based on the cross-section average flow velocity and the flow area.

In a preferred embodiment, during the process of getting the instantaneous flow rate, an expression for getting the instantaneous flow rate according to an embodiment of the invention is as follows:

$$Q = \bar{V} \times S$$

while Q represents the instantaneous flow rate, $\bar{V}$ represents the cross-section average flow velocity, and S represents the flow area.

In a preferred embodiment, during a process of acquiring a layered line flow velocity, the layered line flow velocity is acquired through acquiring a time of up-water (also referred to as upstream) acoustic wave propagation, a time of down-water (also referred to as downstream) acoustic wave propagation, an acoustic velocity propagation time difference, an acoustic channel length and an acoustic channel angle. The acoustic channel length represents a linear distance between two transducers. The abnormal acoustic channel is calibrated based on the layered line flow velocity and the acoustic channel angle.

In a preferred embodiment, during a process of calibrating the abnormal acoustic channel, the abnormal acoustic channel is calibrated through the instantaneous flow rate and/or the layered line flow velocity.

In a preferred embodiment, during a process of acquiring a layered line flow velocity, an acoustic velocity is obtained through an indirect measurement method and then a measured water temperature corresponding to the acoustic velocity is performed comparative measurement with a standard water temperature (also referred to as reference water temperature) to determine measurement accuracy of the acoustic velocity. The criteria for determining the measurement accuracy of the acoustic velocity are as follows:
  when the measured water temperature is in a range of 0-0.51 degrees Celsius (° C.), the measurement of the acoustic velocity is accurate;
  when the measured water temperature is in a range of 0.51-1° C., the measurement of the acoustic velocity is basically accurate; and
  when the measured water temperature is greater than 1° C., the result of the comparative measurement is not satisfactory and thus an operation of adjustment and repair is needed.

In a preferred embodiment, during the process of getting the acoustic velocity, the acoustic velocity is expressed as follows:

$$C = \frac{L}{2} \times \left( \frac{1}{tu} + \frac{1}{td} \right)$$

while L represents the acoustic channel length, tu represents the time of up-water acoustic wave propagation, and td represents the time of down-water acoustic wave propagation.

In a preferred embodiment, during the process of acquiring the layered line flow velocity, an expression of the layered line flow velocity is as follows:

$$V_i = \frac{L}{2 \cos \alpha} \times \frac{\Delta t}{tu \times td},$$

while $V_i$ represents the layered line flow velocity, and α represents the acoustic channel angle, Δt represents the acoustic velocity propagation time difference and meets that Δt=tu−td.

In a preferred embodiment, during the process of calibrating the abnormal acoustic channel, a transducer group of the abnormal acoustic channel is calibrated through adjusting the acoustic channel length and getting a difference between an average of measured water temperatures and the standard water temperature.

In a preferred embodiment, during a process of getting the acoustic velocity through the indirect measurement method, an indirect measurement uncertainty of the acoustic velocity is generated through acquiring an uncertainty component of a direct measurement value for generating the acoustic velocity; the direct measurement value is used to represent a directly measured feature value, and the feature value is used to generate the acoustic velocity through the indirect measurement method. An equation expression of the indirect measurement uncertainty is as follows:

$$u_c = \sqrt{u_1^2 + u_2^2 30 u_3^2 + \ldots + u_i^2}$$

while $u_c$ represents the indirect measurement uncertainty, and $u_i$ represents the uncertainty component, and i is a positive integer, e.g., 1, 2, 3 and so on.

An embodiment of the invention provides a calibration system for an ultrasonic flowmeter based on transit-time method, including: a data collection and identification module, and a calibration and adjustment module.

The data collection and identification module is configured (i.e., structured and arranged) to collect layered water temperature measured values of respective acoustic channels of the ultrasonic flowmeter, and obtain abnormal data of the layered water temperature measurement values.

The calibration and adjustment module is configured to inspect, based on an abnormal acoustic channel corresponding to the abnormal data, the abnormal acoustic channel of the ultrasonic flowmeter through acquiring an instantaneous flow rate and a layered line flow velocity, and adjust parameters of a host of the flowmeter to achieve an optimal calibration of the flowmeter.

The invention is adapted for a massive flow rate and high precision transit-time ultrasonic flowmeter, to measure large pipeline (DN500~DN4800) pipe culverts, culverts, open canals (with rectangular, trapezoidal, composite cross-sections). It can be widely used for flowmeters with difficulty in submission for inspection in various scenes such as water turbine power generation efficiency measurement, remote water diversion project water metering, urban water supply and drainage monitoring, hydrometry and water trade settlement. The calibration system may be an on-line automatic metering device composed of a measuring host, measuring software, measuring cross-section, ultrasonic transducers, a pressure bathymeter and a measuring medium.

A measurement principle of the transit-time ultrasonic flowmeter is the flow velocity-area method.

A mathematical model is that: an instantaneous flow rate $Q=\overline{V}(m/s) \times S(m^2)$, and a layered line flow velocity $$V_i = \frac{L}{2\cos\alpha} \times \frac{\Delta t}{tu \times td},$$

while an acoustic velocity propagation time difference $\Delta t = tu - td$, to represents a time of up-water acoustic wave propagation, td represents a time of down-water acoustic wave propagation, L represents an acoustic channel length (i.e., a linear distance between two transducers), and $\alpha$ represents an acoustic channel angle.

A basic idea of calibration is that: the instantaneous flow rate $Q=\overline{V}(m/s) \times S(m^2)$ is divided into two parts, namely, the cross-section average flow velocity $\overline{V}$ and the flow area S for separate traceability. Then the line flow velocity $V_i$ and the corresponding acoustic channel angle $\alpha$ of each of the acoustic channels are performed with individual traceability.

A measurement of an acoustic velocity C corresponding to the line flow velocity $V_i$ is carried out by indirect measurement method. In particular, based on dependence of the acoustic velocity C on temperature and a result of comparative measurement performed with a standard water temperature, it is determined that:

(0-0.51) ° C. represents the measurement of the acoustic velocity is accurate;

(0.51-1) ° C. represents the measurement of the acoustic velocity is basically accurate; and >1° C. (i.e., greater than 1° C.) represents the result of the comparative measurement is not satisfactory and thus an operation of adjustment and repair is needed.

Indirect Measurement

As shown in Table 1, the indirect measurement is a measurement method that uses a function relationship between a directly measured quantity and a to-be-measured quantity to indirectly obtain a measurement value of the to-be-measured quantity. It measures a quantity that has a definite function relationship with the to-be-measured physical quantity and calculates through an expression of the function relationship, to obtain the needed to-be-measured physical quantity, which has characteristics of comparatively high precision and relatively low cost. The indirectly measured quantity is a function of the directly measured quantity. An indirect measurement uncertainty is the combination of directly measured component uncertainties.

$$u_c = \sqrt{u_1^2 + u_2^2 + u_3^2 + \ldots + u_i^2}$$

while $u_c$ represents a combined uncertainty (i.e., indirect measurement uncertainty) of flowmeter measurement, and $u_i$ represents an uncertainty component of measurement.

TABLE 1

| To-be-measured item | Direct measurement | Indirect measurement function | Description |
| --- | --- | --- | --- |
| Area S of a circle | D | $S = \dfrac{D^2}{4} \times \pi$ | D-pipe inner diameter<br>$\pi = 3.14$ |
| Water depth H | P | $H = \dfrac{P}{\rho \times g}$ | P-water pressure<br>$\rho$-density of water<br>g-gravitational acceleration |

TABLE 1-continued

| To-be-measured item | Direct measurement | Indirect measurement function | Description |
|---|---|---|---|
| Flow velocity V Ultrasonic transit-time method | td, tu, L α | $V_i = \dfrac{L}{2\cos\alpha} \times \dfrac{\Delta t}{tu \times td}$<br>$\Delta t = tu - td$ | tu-time of up-water acoustic wave propagation<br>td-time of down-water acoustic wave propagation<br>L-acoustic channel length<br>α-acoustic channel angle |
| Water temperature T<br>Sum of ultrasonic time | td, tu, L | $C = \dfrac{L}{2} \times \left(\dfrac{1}{tu} + \dfrac{1}{td}\right)$<br>Lookup still-water acoustic velocity C-T relationship table | C-still-water acoustic velocity |

An effect of standard water temperature measurement to calibration on accuracy of transit-time ultrasonic flowmeter is as follows.

As per the formula $$V_i = \frac{L}{2\cos\alpha} \times \frac{\Delta t}{tu \times td},$$

the determination of layered line flow velocity needs propagation times of an up-water signal and a down-water signal. If the propagation times of the up-water signal and the down-water signal are used on the other hand, still-water acoustic velocities of respective acoustic channels can be obtained, and the acoustic velocity C contains information about water temperature. Monitoring the water temperature is of great significance to identify an abnormal value of $V_i$, especially in applications of multiple acoustic channels.

Step 1, a still-water acoustic velocity between transducers is calculated as follows:

$$C = \frac{L}{2} \times \left(\frac{1}{tu} + \frac{1}{td}\right)$$

while tu represents a time of up-water acoustic wave propagation, td represents a time of down-water acoustic wave propagation, L represents an acoustic channel length.

Step 2, based on the relationship between still-water acoustic velocity and temperature, a measured water temperature is obtained as follows:

in a low temperature range of 0° C.-70° C., a direct curve fitting covering the entire range can obtain a high-order polynomial with sufficient accuracy, but it is difficult to implement. However, in actual applications, the temperature range of 0° C.-70° C. is divided into four unequal temperature intervals, and each the temperature interval can be performed with one time of polynomial fitting. This method is simple to implement and can guarantee 0.1% and higher accuracy.

Step 3, the measured water temperature is performed comparative measurement with the standard water temperature.

A result of the comparative measurement is determined as that:

(0-0.51) ° C. represents the measurement of the acoustic velocity is accurate.

(0.51-1) ° C. represents the measurement of the acoustic velocity is basically accurate.

>1° C. represents the result of the comparative measurement is not satisfactory and an adjustment is needed.

Step 4, the acoustic channel length of to-be-calibrated transducers is adjusted.

An operation principle of acoustic velocity detection is as follows:

according to the formula of still-water acoustic velocity $$C = \frac{L}{2} \times \left(\frac{1}{tu} + \frac{1}{td}\right),$$

an error of the acoustic channel length and errors of the propagation times have a negative correlation. Thus, based on an error synthesis theory, a relative error of the acoustic velocity may have an expression as follows:

$$\frac{\Delta C}{C} \cong \frac{\Delta L}{L} - \frac{1}{2}\frac{\Delta tu}{tu} - \frac{1}{2}\frac{\Delta td}{td}.$$

Based on analysis results, it can be found that ΔL/L or same relative errors of Δtu and Δtd has the same impact on ΔC/C. tu and td are variables in the flowmeter and L is a parameter, and therefore it is more convenient to adjust the value of L.

Step 5, during a process of implementing step 1 through step 4, observing the measured water temperature measured for the group of transducers in real time until a difference between the average value of measured water temperatures and the standard water temperature is within a threshold, then completing the calibration of the group of transducers. After the completion of traceability of the time difference Δt=tu−td, going to the traceability of the acoustic channel angle or other indicators.

The advantages and beneficial effects are as follows.

First, originality of traceability method

The basic idea of calibration is dividing the instantaneous flow rate Q=V̄(m/s)×S(m²) into two parts, namely, the cross-section average flow velocity V̄ and the flow area S for separate traceability, and then carrying out individual traceability to the line flow velocity $V_i$ and the corresponding acoustic channel angle α of each of acoustic channels.

The detection of the acoustic velocity corresponding to the line flow velocity $V_i$ uses the indirect measurement method. Based on dependence of the acoustic velocity on temperature and the result of comparative measurement performed with the standard water temperature, it is determined that:

(0-0.51) ° C. represents the measurement of the acoustic velocity is accurate.

(0.51-1) ° C. represents the measurement of the acoustic velocity is basically accurate.

>1° C. represents the result of the comparative measurement is not satisfactory and an operation of adjustment and repair is needed.

This indirection measurement method is simple, practical and low cost.

Second, validity verification of water temperature measurement

Water temperature comparative measurement of flowmeter:

after 24 times of water temperature comparative measurements, verification results are as follows:

a regionally measured low water temperature is 0.48° C., and a regionally measured high water temperature is 30.70° C. Within this water temperature interval, a fitting error between still-wave acoustic velocity measured by the flowmeter and water temperature is less than 0.1%.

a model of the host of the flowmeter, the frequency of the transducers, the still water when a gate is closed, the flow velocity and the atmospheric temperature are not relevant to the measured water temperature comparative measurement results.

the influence of water pressure and salinity on the measured acoustic velocity results are negligible and can be ignored.

the average error of the water temperature comparative measurements is +0.51° C.

An uncertainty source analysis table, as shown in Table 2.

TABLE 2

| Uncertainty source | Uncertainty analysis |
| --- | --- |
| Transit-time ultrasonic flowmeter measured water temperature | ±0.1% × 1° C. = 0.1° C. |
| JM222 digital thermometer | ±0.3° C. |
| Artificial average water temperature measurement method | ±0.11° C. |
| Combined uncertainty | $u_c$ = 0.51° C. |

Third, the calibration objective of the flowmeter is definite and reliable.

Accuracy of massive flow rate metering devices, are shown in Table 3.

TABLE 3

| Flow rate measurement Method | Description of measurement condition | Relative metering accuracy |
| --- | --- | --- |
| Flow velocity meter | Flow velocity measurement two-point method | Channel and river course ±5% |
| Measuring weir | Rectangle sharp-crested weir | Open canal ±(2-5)% |
| Electromagnetic flowmeter | Pipeline diameter | Pipeline ±1% |
| Ultrasonic flowmeter | Transit-time two acoustic channels | Trapezoidal open canal ≥ ±3% Rectangular open canal ±(2-3)% Pressure pipeline ±(0.5-1)% |
|  | Transit-time four acoustic channels | Trapezoidal open canal ±(2-3)% Rectangular open canal ±(1-2)% Pressure pipeline ±0.5% |

TABLE 3-continued

| Flow rate measurement Method | Description of measurement condition | Relative metering accuracy |
| --- | --- | --- |
|  | Transit-time eight acoustic channel | Trapezoidal open canal ±2% Rectangular open canal ±1% Pressure pipeline < ±0.5% |

EXAMPLE 1: TRANSIT-TIME ULTRASONIC FLOWMETER ACCURACY—WATER TEMPERATURE CALIBRATION METHOD

A flowmeter is performed with a water temperature on-site comparative measurement to calibrate the metering accuracy of ultrasonic flowmeter, and a specific implementation method is as follows.

Flowmeter model: eight acoustic channels open canal flowmeter.

Device installation location: 1:2.5 trapezoidal open canal.

Calibration category: the flowmeter being in-use, real flow comparative measurement with handheld digital water thermometer.

Calibration reason: the ultrasonic flowmeter has been put into use for 4 years, and in the second year of use, transducers of $5^{th}$, $6^{th}$, $7^{th}$ and $8^{th}$ acoustic channels were repaired and replaced. At that time, the new transducers were installed without cutting off water.

Because the open canal will carry out water conveyance in winter, the user attaches great importance to the water temperature measured value of the ultrasonic flowmeter. The water temperature measurement of the flowmeter was found to be abnormal. The operation and maintenance personnel promptly reviewed inspection records and found the problem of abnormal water temperature measured value of the flowmeter. The inspection records are shown in Table 4.

TABLE 4

|  | Inspection time | Flowmeter T ° C. | Measured actual water temperature ° C. | Water temperature difference ° C. |
| --- | --- | --- | --- | --- |
| Records before calibration | 2017 Dec. 19 | 4.89 | 3.7 | 1.19 |
|  | 2018 Jan. 10 | 3.01 | 1.8 | 1.21 |
|  | 2-18-1-29 | 1.82 | 0.7 | 1.12 |
| Records after calibration | 2018 Jan. 29 | 0.48 | 0.7 | −0.22 |
|  | 2018 Feb. 8 | 1.3 | 1.3 | 0.00 |
|  | 2-18-3-7 | 5.9 | 6.1 | −0.20 |

Calibration Method

First step: entering a host F3 diagnosis DIAG interface of the ultrasonic flowmeter, to view layered water temperature measurement values of eight acoustic channels:

Tp1=0.47° C.
Tp2=0.48° C.
Tp3=0.50° C.
Tp4=0.44° C.
Tp5=4.27° C., abnormal
Tp6=3.58° C., abnormal
Tp7=3.01° C., abnormal
Tp9912.08, being not inundated.

It was found that the measured water temperatures on the $5^{th}$, $6^{th}$ and $7^{th}$ acoustic channels are significantly higher.

Second step: adjusting the parameter of relevant acoustic channel length L

The original value of the acoustic channel length $L_5=31.308$ in, the current value of the acoustic channel length $L_5=31.108$ in, and the difference valve therebetween is −0.2 in.

The original value of the acoustic channel length $L_6=33.380$ in, the current value of the acoustic channel length $L_6=33.021$ in, and the difference valve therebetween is −0.359 in.

The original value of the acoustic channel length $L_7=35.076$ in, the current value of the acoustic channel length $L_7=34.966$ in, and the difference valve therebetween is −0.11 in.

After the adjustments, the water temperature measured value of the ultrasonic flowmeter is 0.48° C., which is close to the freezing temperature.

Flow Rate Adjustment Process:

Since: L↓-C↓-T↓

Thus: L↓-$V_i$↓-∇↓-Q↓.

Water temperature measuring instrument: JM624 digital thermometer.

Temperature measuring range: −50.0-199.9° C.
Accuracy: ±0.1%
Resolution: 0.1° C.
Sensor: Pt1000
Acoustic velocity calibration principle:

$$\frac{\Delta C}{C} \cong \frac{\Delta L}{L} - \frac{1}{2}\frac{\Delta tu}{tu} - \frac{1}{2}\frac{\Delta td}{td}.$$

Because ΔL/L or same relative errors of Δtu and Δtd have the same impact on ΔC/C. to and td are variables in the flowmeter and L is a parameter, and therefore it is more convenient to adjust the value of L.

Calibration method of line flow velocity:

It is known that: ① Four acoustic channel's line flow velocities measured by the flowmeter are $V_i=(V_1, V_2, V_3, V_4)$. ② LT2 electronic theodolite's angle measurement accuracy is 2".

First step, calculating measurement uncertainty of acoustic channel angle:

$$2''/3600'' = 0.0006°$$

$$\frac{0.0006°}{45°} \times 100\% = 0.013\%$$

Second step, calculating uncertainty of line flow velocity:

$$u_{cr}=\sqrt{0.14^2+0.013^2}=0.142\%$$

Third step, comparing with a corresponding cross-section flow pattern diagram to find out an outlier.

Fourth step, calculating out a result:

$$V_i = \frac{V_{diff}}{\cos \alpha} \text{ m/s} \pm 0.14\%$$

Acoustic channel angle calibration method of measured acoustic velocity $V_i$. Using Excel to make a flow pattern diagram, to find an outlier of the line flow velocity $V_i$.

As shown in Table 5 and Table 6, collected measurement data of the eight acoustic channel trapezoidal open canal ultrasonic flowmeter are illustrated. H=3.52 m, and Q=46.1 m³/s.

TABLE 5

| Acoustic channel | Flow velocity $V_i$ | Water depth H |
|---|---|---|
| $V_7$ | 0.671 | 3.5 |
| $V_6$ | 0.777 | 3 |
| $V_5$ | 0.802 | 2.5 |
| $V_4$ | 0.816 | 2 |
| $V_3$ | 0.816 | 1.5 |
| $V_2$ | 0.817 | 1 |
| $V_1$ | 0.798 | 0.5 |

TABLE 6

| Acoustic channel | Flow velocity $V_i$ | Water depth H |
|---|---|---|
|  | 0.669 | 3.52 |
| $V_7$ | 0.671 | 3.5 |
| $V_6$ | 0.777 | 3 |
| $V_5$ | 0.802 | 2.5 |
| $V_4$ | 0.816 | 2 |
| $V_3$ | 0.821 | 1.5 |
| $V_2$ | 0.817 | 1 |
| $V_1$ | 0.798 | 0.5 |
|  | 0.778 | 0.2 |
|  | 0.7 | 0.01 |

The outlier is corresponding to the third acoustic channel, and the flow velocity $V_3=0.816$ m/s.

A flow velocity meter is used to comparatively measure an actual flow velocity $V_i$.

As illustrated in FIG. 2, it is measured at downstream that the bridge is about 350 m away from the measurement cross-section, and the bridge is perpendicular to the center line of the river.

Comparative Measurement Method of Line Flow Velocity

LJ12-1A type flow velocity meter is employed, and XZ-3 type intelligent flow velocity meter counter is used for data reading.

At 1.5 m water depth of $V_3$ acoustic channel, measuring 5 points horizontally, and each of the points with 7 values from which an intermediate value is taken.

Calculating an average value:

$$V_{line}=V_{1.5\ m}=(V_1+V_2+V_3+V_4+V_5)\div 5=0.821 \text{ m/s}.$$

Calculating out a new acoustic channel angle with a proportional relationship

It is known that: the outlier is the third acoustic channel's flow velocity $V_3=0.816$ m/s;

Actually measured $V_3=0.821$ m/s. Lookup a parameter table of the flowmeter, the third acoustic channel's acoustic channel angle is 45°, Cos 45°=0.707. Then solve the new acoustic channel angle a as follows:

$$\text{since } \cos 45° = \frac{V}{0.816}, \quad \cos \alpha = \frac{V}{0.821}$$

$$\text{thus, } \cos \alpha = \frac{0.816}{0.821} \times 0.707 = 0.7.$$

It can be found through a mobile phone calculator that α=45.57°.

Then, modifying the parameter of acoustic channel angle of the flowmeter.

Flow cross-section (discharge cross-section) measurement uncertainty analysis, as shown in Table 7.

TABLE 7

| Cross-section | Calculation formula | Uncertainty component | | |
|---|---|---|---|---|
| Pipeline | $D^2/4 \times \pi$ | $S_{(x)}$ D 0.1% | Water depth H = 0 | |
| Rectangle | $\Sigma H_i \times W_i$ | $S_{(x)}$ $H_i W_i$ 0.1% | 0.11% | |
| Trapezoid | $\Sigma(H_i + H_{i+1})/2 \times W_i$ | $S_{(x)}$ $H_i W_i$ 0.1% | 0.13% | |
| Pipe culvert | $\Sigma(H_i + H_{i+1})/2 \times W_i$ | $S_{(x)}$ $H_i W_i$ 0.1% | 0/12% | |

Calculation Example of Trapezoidal Open Canal

It is known that: ① For the trapezoidal open canal, bottom width a=20 m, and water surface width b=25.6 m. ② The measured value of a pressure bathymeter is H=1.53 m. ③ The measurement accuracy of the pressure bathymeter is ±0.01 m. ④ The steel ruler accuracy is 0.1%.

First step, calculating a relative uncertainty of water depth, $$u_r = 0.1 \times 1.53 \times 100\% = 0.15\%$$

Second step, calculating a relative combined uncertainty of flow area, $$u_{cr} = \sqrt{0.15^2 + 0.13^2} = 0.2\%$$

The relative combined uncertainty is 0.2%, or a relative extended uncertainty is 0.4%.

Third step, calculating the flow area S, $$S = (20+25.6)/2 \times 1.53 = 34.88 \, m^2/s$$

Fourth step, getting a calculation result of trapezoidal flow area with the water depth of 1.53 m as 34.88 m²/s±0.2%.

The calibration method has studied the practical problems such as accuracy calibration of stock equipment in-use, and technical updating and iteration of transit-time ultrasonic flowmeter, and proposes an ideological system of three key technologies, namely, direct measurement and indirect measurement technology, laboratory comparison and real flow comparison technology, and measurement uncertainty combine technology, so that the inspection of the massive flow rate and high precision transit-time ultrasonic flowmeter develop towards the direction of no submission for inspection.

Embodiments of the invention are described with reference to flowcharts and/or block diagrams of methods, devices (systems), and computer program products according to embodiments of the invention. It should be understood that each procedure and/or block in the flowchart and/or the block diagram, and a combination of procedures and/or blocks in the flowchart and/or the block diagram, may be implemented by computer program instructions. These computer program instructions may be provided to a processor of a general-purpose computer, a special-purpose computer, an embedded processor, or other programmable data processing device to generate a machine, such that instructions executed by a processor of a computer or other programmable data processing device generate means for implementing one or more procedures of the flowchart and/or the function(s) specified in one or more blocks of the block diagram.

In the description of the embodiments of the invention, it should be understood that the terms "first" and "second" are used only for descriptive purposes and cannot be understood as indicating or implying relative importance or implying the number of indicated technical features. Thus, the features defined as "first" and "second" may explicitly or implicitly include one or more of the features. In the description of the embodiments of the invention, "multiple" means two or more, unless otherwise specifically defined.

Apparently, those skilled in the art can make various modifications and variations to the illustrated embodiments of the invention without departing from the spirit and scope of the invention. Thus, if these modifications and variations of the embodiments of the invention should fall within the scope of protection of the appended claims of the invention and their equivalents, the present is also intended to include these modifications and variations.

What is claimed is:

1. An on-site calibration method of an ultrasonic flowmeter based on acoustic velocity detection, comprising:
    step 1: calculating a still-water acoustic velocity between transducers of the ultrasonic flowmeter as follows:

$$C = \frac{L}{2} \times \left(\frac{1}{tu} + \frac{1}{td}\right)$$

where, C represents the still-water acoustic velocity, tu represents a time of up-water acoustic wave propagation, td represents a time of down-water acoustic wave propagation, and L represents an acoustic channel length;
    step 2: obtaining a measured water temperature based on a relationship between the still-water acoustic velocity and temperature;
    step 3: comparing the measured water temperature with a standard water temperature to obtain a comparative result;
    step 4: adjusting an acoustic channel length of the transducers based on the comparative result;
    step 5: adjusting the acoustic channel length of to-be-calibrated transducers of the transducers until the measure water temperature is closed to the standard water temperature, thereby completing the calibration of the still-water acoustic velocity between transducers; and
    step 6: calibrating a line flow velocity of the ultrasonic flowmeter, calibrating an acoustic channel angle of the ultrasonic flowmeter, and calibrating a flow area of the ultrasonic flowmeter, thereby completing the calibration of the ultrasonic flowmeter;
    wherein in the step 6, the line flow velocity and the flow area are measured with an indirect measurement method, and an indirect measurement uncertainty is as follows:

$$u_c = \sqrt{u_1^2 + u_2^2 30 u_3^2 + \ldots + u_i^2}$$

where $u_c$ represents the indirect measurement uncertainty, $u_i$ represents an uncertainty component, and i represents a positive integer;
    wherein in the step 6, a process of calibrating the acoustic channel angle of the ultrasonic flowmeter comprises:
    using the ultrasonic flowmeter to collect line flow velocities of acoustic channels:
    using a corresponding cross-section flow pattern diagram to find out an outlier line flow velocity of the line flow velocities of the acoustic channels and determine a targeted acoustic channel corresponding to the outlier line flow velocity
    using a flow velocity meter to obtain an actual line flow velocity of the targeted acoustic channel;
    checking a parameter table of the ultrasonic flowmeter to obtain an acoustic channel angle β of the targeted acoustic channel; and determine a calibrated acoustic channel angle α by a formula:

$$\cos\alpha = \frac{\text{outlier line flow velocity}}{\text{actual line flow velocity}} \times \text{acoustic channel angle } \beta,$$

acoustic channel angle β, replacing the acoustic channel angle β with the calibrated acoustic channel angle α, thereby completing the calibration of ultrasonic flowmeter.

\* \* \* \* \*